United States Patent
Urisaka

(10) Patent No.: US 9,036,049 B2
(45) Date of Patent: May 19, 2015

(54) IMAGE CAPTURING APPARATUS AND EXPOSURE CONTROL METHOD

(71) Applicant: CANON KABUSHIKI KAISHA, Tokyo (JP)

(72) Inventor: Shinya Urisaka, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 92 days.

(21) Appl. No.: 13/875,381

(22) Filed: May 2, 2013

(65) Prior Publication Data

US 2013/0308010 A1  Nov. 21, 2013

(30) Foreign Application Priority Data

May 18, 2012   (JP) ................................ 2012-114990

(51) Int. Cl.
*H04N 9/73*   (2006.01)
*H04N 5/238*  (2006.01)
*H04N 5/235*  (2006.01)
*H04N 9/64*   (2006.01)

(52) U.S. Cl.
CPC ............... *H04N 9/646* (2013.01); *H04N 5/235* (2013.01); *H04N 9/735* (2013.01)

(58) Field of Classification Search
CPC .................................................. H04N 9/735
USPC .................................... 348/223.1, 364, 229.1
See application file for complete search history.

(56) References Cited

U.S. PATENT DOCUMENTS

| 2011/0096192 A1* | 4/2011 | Niikura ..................... 348/223.1 |
| 2011/0157425 A1* | 6/2011 | Nakayama ................. 348/234 |
| 2011/0279710 A1* | 11/2011 | Lee .............................. 348/234 |

FOREIGN PATENT DOCUMENTS

| JP | 2007-036438 A | 2/2007 |
| JP | 2010-145979 A | 7/2010 |

* cited by examiner

*Primary Examiner* — Nhan T Tran
*Assistant Examiner* — Chan Nguyen
(74) *Attorney, Agent, or Firm* — Carter, DeLuca, Farrell & Schmidt, LLP

(57) ABSTRACT

In an image capturing apparatus, a subject image is converted into an image signal, which undergoes automatic correction processing including white balance correction processing, and further undergoes image quality change processing. A first evaluation value indicating a largest value of an R signal, a G signal, and a B signal of the image signal undergone the image quality change processing and a second evaluation value indicating a luminance of the image signal undergone the image quality change processing are detected. A control evaluation value is calculated using weighted average of the first evaluation value and the second evaluation value according to at least one of an amount of image quality changing effect due to the image quality change processing and a reliability of the automatic correction processing, and exposure control is performed based on the control evaluation value.

16 Claims, 5 Drawing Sheets

IMAGE CAPTURING APPARATUS AND EXPOSURE CONTROL METHOD

BACKGROUND OF THE INVENTION

1. Field of the Invention

The present invention relates to exposure control of an image capturing apparatus.

2. Description of the Related Art

Conventionally, examples of a photometric value used for exposure control in an image capturing apparatus include a luminance evaluation value, and a NAM evaluation value in which a largest value of an R signal, a G signal, and a B signal of an image signal is output as an evaluation value. In ordinary automatic exposure control, on the premise that white balance has been achieved, preferable exposure control can be performed when using the NAM evaluation value as a photometric value, and, thus, the exposure control is performed usually using the NAM evaluation value as a photometric value.

FIG. 5 is a view showing the schematic configuration of a conventional image capturing apparatus. In FIG. 5, a diaphragm 192 is disposed behind a lens 191, and light that has entered the apparatus via the lens 191 and the diaphragm 192 forms an image as a subject image on an imaging plane of an imaging device 195. In the imaging device 195, the formed subject image is converted from a light signal into an image signal. The image signal obtained by the imaging device 195 is transmitted via a microcomputer 199 to a NAM evaluation value detection unit 197, and a NAM evaluation value is obtained in the NAM evaluation value detection unit 197. Then, based on the NAM evaluation value obtained from the NAM evaluation value detection unit 197, the microcomputer 199 uses an exposure control unit 193 to perform exposure control by controlling the diaphragm 192, the shutter speed of the imaging device 195, and the gain.

Meanwhile, for example, there is a conventional technique such as a method disclosed in Japanese Patent Laid-Open No. 2007-36438 for obtaining a correction amount with respect to a proper exposure value. According to this method, first, the entire screen is divided into a plurality of areas, white areas whose representative color is white are discriminated from among these areas, and the occupancy of the white areas with respect to all areas is obtained according to the number of white areas in the entire screen. Then, the obtained occupancy with respect to all areas is multiplied by a maximum exposure correction amount, and, thus, a correction amount with respect to a proper exposure value is obtained.

However, as in the case of using an image quality converting filter that has an image quality changing effect of significantly changing the tint, the white balance may be intentionally significantly shifted. Furthermore, the white balance may be intentionally significantly shifted in image quality settings by a user, or the white balance may be significantly shifted in automatic white balance correction control. If the NAM evaluation value is used when the white balance is significantly shifted from the white color contrary to ordinary cases, the influence of the tint acts, and the control is significantly shifted from ordinary proper exposure control.

Furthermore, the above-described method disclosed in Japanese Patent Laid-Open No. 2007-36438 is based on the premise that white areas are present, and is not effective when the entire screen is in chromatic colors due to the image quality changing effect or the like.

Furthermore, if the luminance evaluation value is used instead of the NAM evaluation value, the influence of the tint due to white balance shift does not act, but the performance becomes different from that in ordinary exposure control.

SUMMARY OF THE INVENTION

The present invention has been made in consideration of the above situation, and improves the performance of automatic exposure control by reducing a change in the performance of the automatic exposure control, which is caused by the performance level of image quality change processing or automatic correction processing such as automatic white balancing in an image capturing apparatus.

According to the present invention, provided is an image capturing apparatus comprising: an image sensor configured to convert a subject image into an image signal and output the image signal; an automatic correction unit configured to perform automatic correction processing including white balance correction processing on the image signal output from the image sensor; an image quality changing unit configured to perform image quality change processing on the image signal on which the automatic correction processing has been performed by the automatic correction unit; a first evaluation value detection unit configured to obtain a first evaluation value indicating a largest value of an R signal, a G signal, and a B signal of the image signal on which the image quality change processing has been performed by the image quality changing unit; a second evaluation value detection unit configured to detect a second evaluation value indicating a luminance of the image signal on which the image quality change processing has been performed by the image quality changing unit; and an exposure control unit configured to calculate a control evaluation value using weighted average of the first evaluation value and the second evaluation value according to at least one of an amount of image quality changing effect due to the image quality change processing performed by the image quality changing unit on the image signal and a reliability of the automatic correction processing performed by the automatic correction unit on the image signal, and perform exposure control based on the control evaluation value; wherein the exposure control unit relatively increases a weight of the second evaluation value as the amount of image quality changing effect increases, and relatively increases a weight of the second evaluation value as the reliability decreases.

According to the present invention, provided is an exposure control method in an image capturing apparatus having an image sensor configured to convert a subject image into an image signal and output the image signal, an automatic correction unit configured to perform automatic correction processing including white balance correction processing on the image signal output from the image sensor, and an image quality changing unit configured to perform image quality change processing on the image signal on which the automatic correction processing has been performed by the automatic correction unit, comprising: obtaining a first evaluation value indicating a largest value of an R signal, a G signal, and a B signal of the image signal on which the image quality change processing has been performed by the image quality changing unit; detecting a second evaluation value indicating a luminance of the image signal on which the image quality change processing has been performed by the image quality changing unit; calculating a control evaluation value using weighted average of the first evaluation value and the second evaluation value according to at least one of an amount of image quality changing effect due to the image quality change processing performed by the image quality changing unit on the image signal and a reliability of the automatic correction processing performed by the automatic correction unit on the image signal; and performing exposure control based on the control evaluation value calculated in the calculation step;

wherein a weight of the second evaluation value is relatively increased as the amount of image quality changing effect increases, and a weight of the second evaluation value is relatively increased as the reliability decreases.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
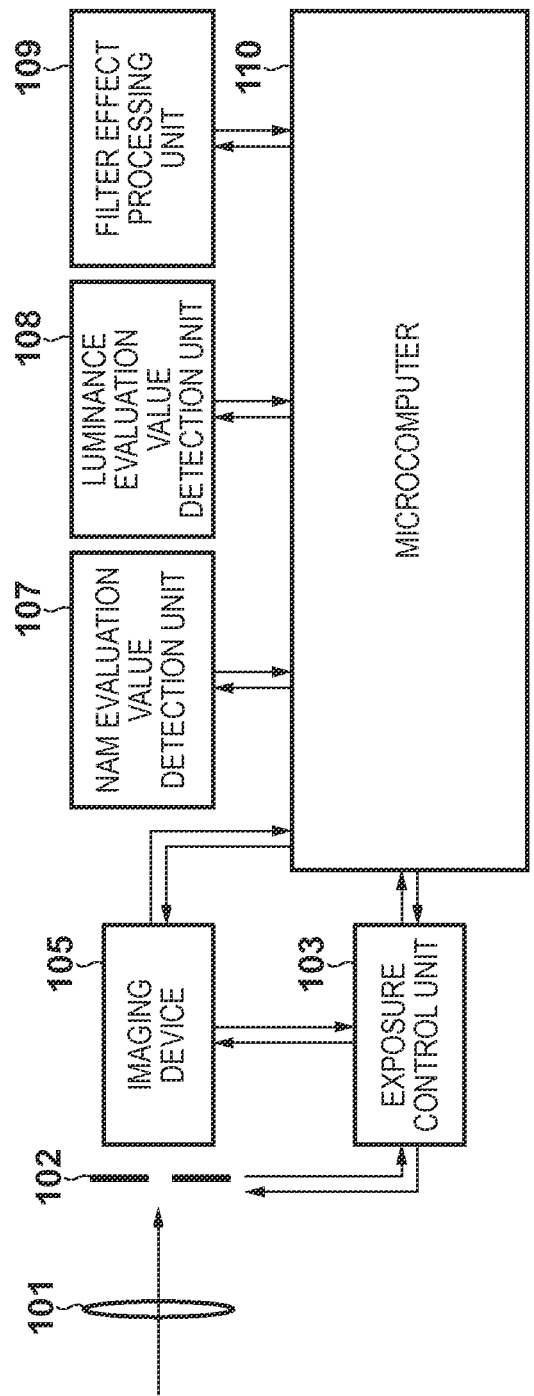
FIG. 1 is a diagram showing the schematic configuration of an image capturing apparatus according to an embodiment of the present invention.

FIG. 1 is a diagram showing the schematic configuration of an image capturing apparatus according to the first embodiment. In FIG. 1, a diaphragm 102 is disposed behind a lens 101, and light that has entered the apparatus via the lens 101 and the diaphragm 102 forms an image as a subject image on an imaging plane of an imaging device 105. In the imaging device 105, the formed subject image is converted from a light signal into an image signal. The image signal obtained by the imaging device 105 is transmitted to a microcomputer 110 where automatic correction processing such as white balance correction processing, gamma processing, and color conversion processing is performed.

The image signal that has been processed in the microcomputer 110 is transmitted to a NAM evaluation value detection unit 107, a luminance evaluation value detection unit 108, and a filter effect processing unit 109. In the filter effect processing unit 109, image quality change processing such as white balancing, black balancing, and color balancing can be performed in order to achieve the image quality changing effect instructed by the user. Here, the tint of the image can be changed as instructed by the user, by intentionally shifting the white balance, the black balance, and the color balance.

The NAM evaluation value detection unit 107 detects, among photometric values used for exposure control, a NAM evaluation value indicating a largest value of an R signal, a G signal, and a B signal of an image signal. The luminance evaluation value detection unit 108 detects a luminance evaluation value among photometric values used for exposure control. Based on the NAM evaluation value obtained from the NAM evaluation value detection unit 107 and the luminance evaluation value obtained from the luminance evaluation value detection unit 108, the microcomputer 110 uses an exposure control unit 103 to perform exposure control. In this example, the exposure control includes at least one of control of the diaphragm 102, control of the shutter speed of the imaging device 105, and control of the gain. The exposure control by the microcomputer 110 based on each evaluation value will be described later in detail. The microcomputer 110 also controls operations in which charge is accumulated or read from the imaging device 105.

Figure 2:
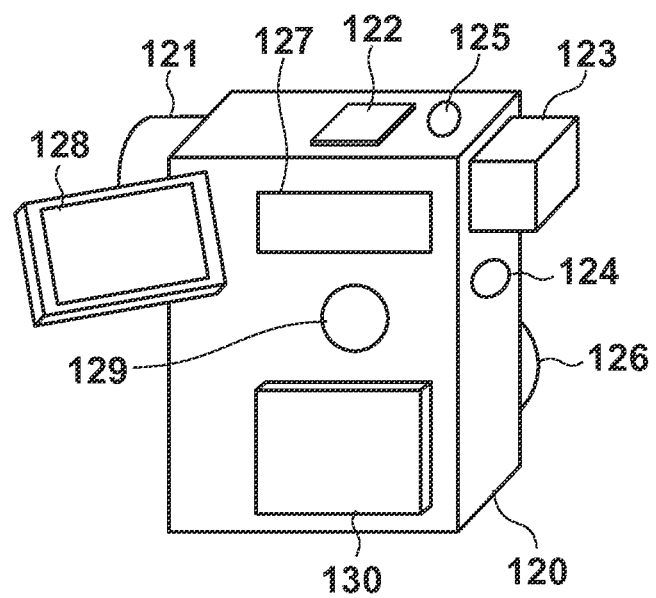
FIG. 2 is a perspective view showing the outline of the image capturing apparatus according to the embodiment of the present invention.

FIG. 2 is a perspective view showing the outline of the image capturing apparatus shown in FIG. 1. In FIG. 2, an image capturing apparatus main body 120 accommodates a removable storage medium (not shown) such as a DVD disc, a magnetic tape, and a memory card, and can record and playback image signals and still images. Reference numeral 121 denotes a lens unit, and reference numeral 122 denotes a microphone that is provided in order to record sounds during image capture. An electronic viewfinder (EVF) 123 is a unit through which the user looks in order to target on or view the subject during image capture with a camera.

A moving image trigger switch 124 is a push button that is operated by the user in order to instruct the apparatus to start and end the capture of moving images. A still image trigger switch 125 is a push button that is operated by the user in order to instruct the apparatus to start and end the capture of still images. A mode dial 126 is configured as a rotary switch with which the mode can be selected from among, for example, "playback" for playback mode setting, "camera" for camera mode setting, and "OFF" other than the above. An operation switch group 127 includes keys with which the user can operate the main body, such as keys for inputting image quality filtering modes and keys for other operations such as menu operation and playback operation.

A display unit 128 having a liquid crystal panel is attached such that it can be opened and closed with respect to a side face of the main body, and is mainly used to view a subject image during image capture as in the case of the EVF 123 and to display a playback image during playback. Furthermore, the display unit 128 that has been opened from the main body 120 can further rotate in the horizontal direction. A loudspeaker 129 is provided in order to output sounds during playback. A battery 130 is removable from the main body 120.

Hereinafter, calculation processing of a control evaluation value and exposure control by the microcomputer 110 of the thus configured image capturing apparatus according to the first embodiment will be described with reference to the flowchart in FIG. 3.

Figure 3:
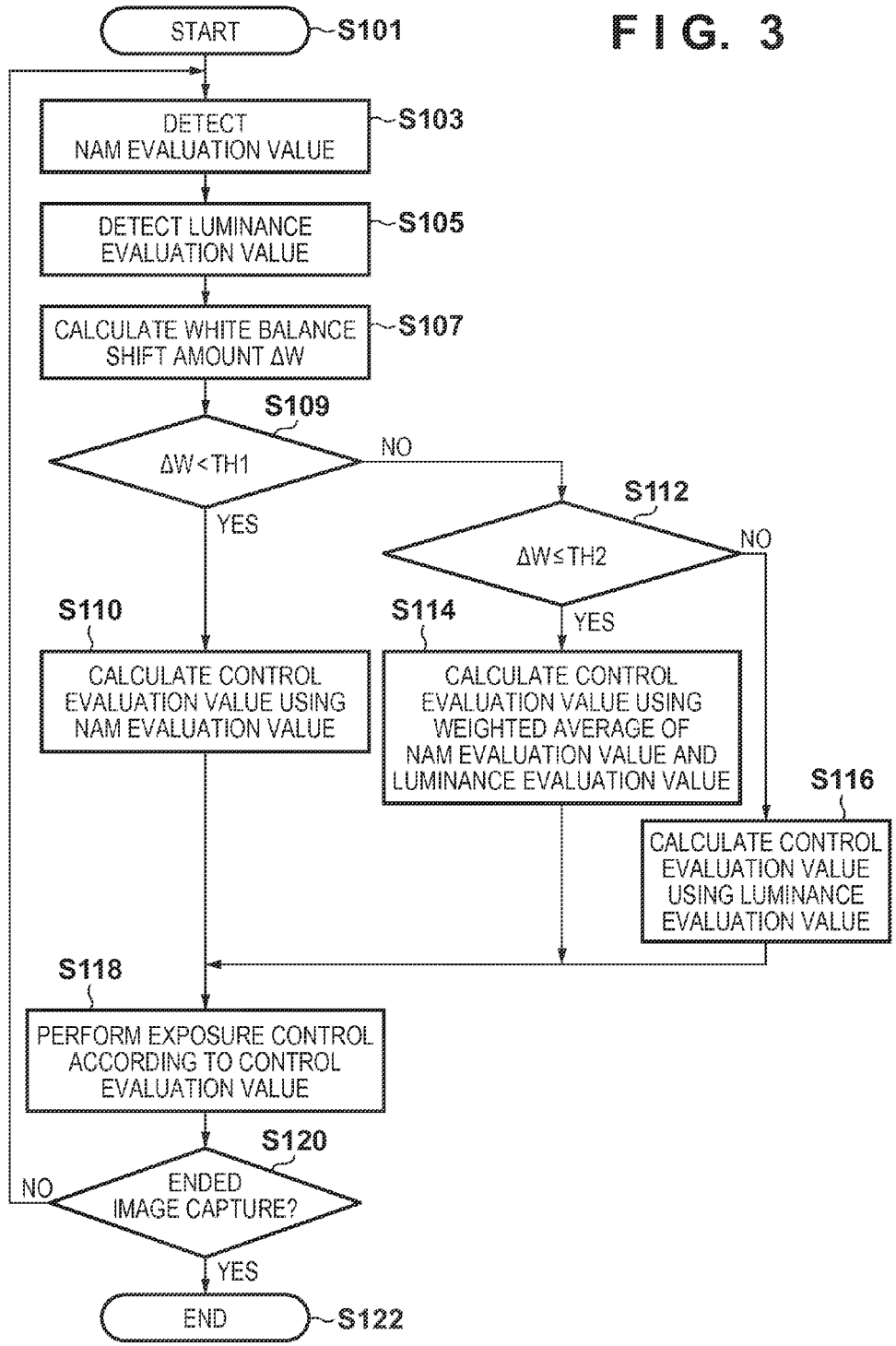
FIG. 3 is a flowchart showing exposure control in the image capturing apparatus according to a first embodiment.

FIG. 3 is a flowchart showing exposure control according to the first embodiment. When the power is turned on and the camera mode is set with the mode dial 126, the processing starts (Step S101). The microcomputer 110 uses the NAM evaluation value detection unit 107 to detect a NAM evaluation value (Step S103), and uses the luminance evaluation value detection unit 108 to detect a luminance evaluation value (Step S105).

Subsequently, the microcomputer 110 calculates an amount $\Delta W$ of white balance shift caused by image quality change processing performed by the filter effect processing unit 109 on image signals (Step S107). Then, the calculated white balance shift amount $\Delta W$ is compared with a preset threshold TH1 for the shift amount (Step S109). If the white balance shift amount $\Delta W$ is smaller than the threshold TH1, the microcomputer 110 calculates a control evaluation value for exposure control using only the NAM evaluation value detected in Step S103 (Step S110). In this case, if the weight of the NAM evaluation value is taken as $k_1$ and the weight of the luminance evaluation value as $k_2$, the control evaluation value can be calculated using weighted average with $k_1=1$ and $k_2=0$.

On the other hand, if the white balance shift amount $\Delta W$ is equal to the threshold TH1 or larger, the shift amount $\Delta W$ is compared with a preset threshold TH2 for the shift amount, which is larger than TH1 (Step S112). If the white balance shift amount $\Delta W$ is equal to the threshold TH2 or smaller, the microcomputer 110 calculates a control evaluation value for exposure control, using weighted average of the NAM evaluation value and the luminance evaluation value (Step S114). At that time, the weights $k_1$ and $k_2$ used in the weighted average of the NAM evaluation value and the luminance evaluation value are set such that weight $k_2$ of the luminance evaluation value relatively increases as the white balance shift amount $\Delta W$ increases.

On the other hand, if the white balance shift amount $\Delta W$ is larger than the threshold TH2, the microcomputer 110 calculates a control evaluation value for exposure control using only the luminance evaluation value (Step S116). In this case, the control evaluation value can be calculated using weighted average with $k_1=0$ and $k_2=1$.

Note that there are known methods for calculating a control evaluation value (photometric value) for exposure control using the NAM evaluation value and the luminance evaluation value, such as a method disclosed in Japanese Patent Laid-Open No. 2010-145979, and, thus, a description thereof has been omitted in this specification. Furthermore, the control evaluation value for exposure control can be calculated using a similar method with a value obtained by performing weighted average on the NAM evaluation value and the luminance evaluation value.

According to the thus calculated control evaluation value, the microcomputer 110 uses the exposure control unit 103 to perform exposure control including at least one of control of the diaphragm 102, control of the shutter speed of the imaging device 105, and control of the gain (Step S118).

After this processing, it is determined whether or not the image capture is being continuously performed (Step S120), and the processing from Step S103 is repeated until the power is turned off and the control ends or a mode other than the camera mode is set. When the power is turned off or a mode other than the camera mode is set with the mode dial 126, the exposure control processing ends (Step S122).

In this example, a case was described in which the amount of image quality changing effect on an image signal is a white balance shift amount. However, the present invention is not limited to this, and the amount of image quality changing effect may be an amount other than the white balance shift amount, such as a black balance shift amount, a color balance shift amount, or a combination of these plurality of shift amounts.

As described above, according to the first embodiment, if image quality change processing is not performed, exposure control is performed using only the NAM evaluation value, and, thus, exposure control can be performed with a performance similar to that in ordinary automatic exposure control using only the NAM evaluation value. On the other hand, if the tint has been changed by image quality change processing, the luminance evaluation value is used. In this manner, if an image quality converting filter is used, a change in the performance of automatic exposure control, which is caused by a change in the tint due to the image quality change processing, can be reduced, and, thus, the performance of the automatic exposure control can be improved.

Second Embodiment

Hereinafter, a second embodiment of the present invention will be described. The second embodiment is different from the first embodiment described above in terms of calculation processing of a control evaluation value and exposure control by the image capturing apparatus, but is similar to the first embodiment in aspects other than the above, and, thus, the different aspects will be described below.

Figure 4:
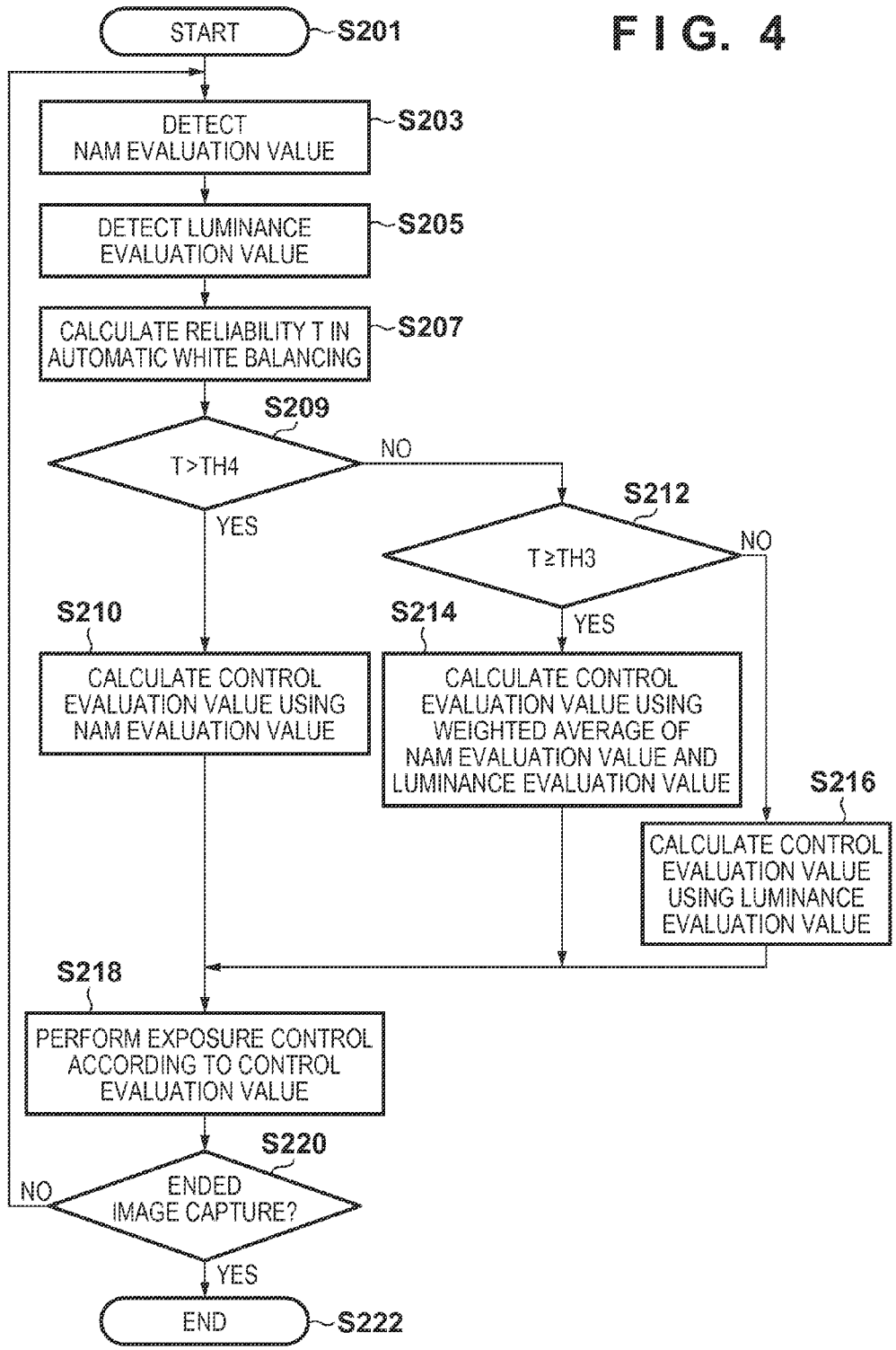
FIG. 4 is a flowchart showing exposure control in the image capturing apparatus according to a second embodiment.
Figure 5:
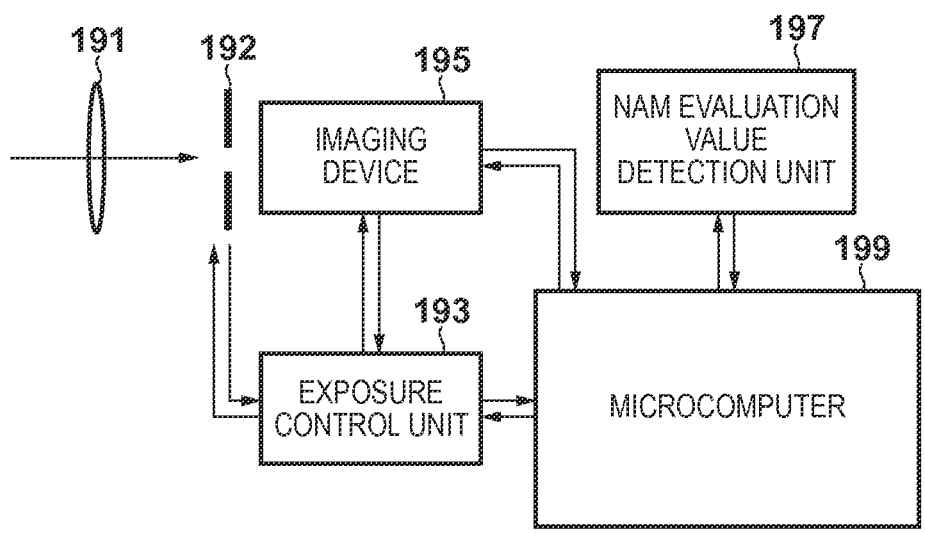
FIG. 5 is a view showing the schematic configuration of a conventional image capturing apparatus.

FIG. 4 is a flowchart showing exposure control according to the second embodiment. When the power is turned on and the camera mode is set with the mode dial 126, the processing starts (Step S201). The microcomputer 110 uses the NAM evaluation value detection unit 107 to detect a NAM evaluation value (Step S203), and uses the luminance evaluation value detection unit 108 to detect a luminance evaluation value (Step S205).

Subsequently, the microcomputer 110 calculates a reliability T of white balance correction processing, among the automatic correction processing such as white balance correction processing, gamma processing, and color conversion processing performed on image signals (Step S207). Then, the calculated reliability T is compared with a preset reliability threshold TH4 (Step S209). If the reliability T is larger than the threshold TH4, the microcomputer 110 calculates a control evaluation value for exposure control using only the NAM evaluation value (Step S210). In this case, if the weight of the NAM evaluation value is taken as $k_3$ and the weight of the luminance evaluation value as $k_4$, the control evaluation value can be calculated using weighted average with $k_3=1$ and $k_4=0$.

On the other hand, if the reliability T is equal to the threshold TH4 or smaller, the reliability T is compared with a preset reliability threshold TH3, which is smaller than the threshold TH4 (Step S212). If the reliability T is equal to the threshold TH3 or larger, the microcomputer 110 calculates a control evaluation value for exposure control, using weighted average of the NAM evaluation value and the luminance evaluation value (Step S214). At that time, the weights $k_3$ and $k_4$ used in the weighted average of the NAM evaluation value and the luminance evaluation value are set such that the weight $k_4$ of the luminance evaluation value relatively increases as the reliability T of the automatic white balance correction control decreases.

On the other hand, if the reliability T is smaller than the threshold TH3, the microcomputer 110 calculates a control evaluation value for exposure control using only the luminance evaluation value (Step S216). In this case, the control evaluation value can be calculated using weighted average with $k_3=0$ and $k_4=1$.

According to the thus calculated control evaluation value, the microcomputer 110 uses the exposure control unit 103 to perform exposure control including at least one of control of the diaphragm 102, control of the shutter speed of the imaging device 105, and control of the gain (Step S218).

After this processing, it is determined whether or not the image capture is being continuously performed (Step S220), and the processing from Step S203 is repeated until the power is turned off and the control ends. When the power is turned off or a mode other than the camera mode is set with the mode dial 126, the exposure control processing ends (Step S222).

As described above, in the exposure control of an image capturing apparatus, a change in the performance of automatic exposure control, which is caused by the performance level of automatic white balance correction, can be reduced, and, thus, the performance of the automatic exposure control can be improved.

Note that both of the adjustment of exposure control according to image quality change processing described in the first embodiment and the adjustment of exposure control according to the reliability of automatic correction processing described in the second embodiment may be performed. In this case, for example, control evaluation values respectively obtained by these controls may be simply averaged, or subjected to weighted average by weighting the control evaluation values. If the thus obtained control evaluation value is used, a change in the performance of automatic exposure control, depending on a change in the tint due to image quality change processing and a performance level of automatic white balance correction, can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-114990, filed on May 18, 2012 which is hereby incorporated by reference herein in its entirety.

What is claimed is:

1. An image capturing apparatus comprising:
an image sensor configured to convert a subject image into an image signal and output the image signal;
an automatic correction unit configured to perform automatic correction processing including white balance correction processing on the image signal output from the image sensor;
an image quality changing unit configured to perform image quality change processing on the image signal on which the automatic correction processing has been performed by the automatic correction unit;
a first evaluation value detection unit configured to obtain a first evaluation value indicating a largest value of an R signal, a G signal, and a B signal of the image signal on which the image quality change processing has been performed by the image quality changing unit;
a second evaluation value detection unit configured to detect a second evaluation value indicating a luminance of the image signal on which the image quality change processing has been performed by the image quality changing unit; and
an exposure control unit configured to calculate a control evaluation value using a weighted average of the first evaluation value and the second evaluation value according to at least one of an amount of image quality changing effect due to the image quality change processing performed by the image quality changing unit on the image signal and a reliability of the automatic correction processing performed by the automatic correction unit on the image signal, and perform exposure control based on the control evaluation value,
wherein the exposure control unit relatively increases a weight of the second evaluation value as the amount of image quality changing effect increases, and relatively increases a weight of the second evaluation value as the reliability decreases.

2. The image capturing apparatus according to claim 1, wherein the image quality change processing includes processing that shifts at least one of white balance, black balance, and color balance of the image signal, and the amount of image quality changing effect includes at least one of a white balance shift amount, a black balance shift amount, and a color balance shift amount.

3. The image capturing apparatus according to claim 1, wherein the reliability of the automatic correction processing is a reliability of the white balance correction processing.

4. The image capturing apparatus according to claim 1, wherein the exposure control unit sets a weight of the first evaluation value at 1 and sets a weight of the second evaluation value at 0 in a case where the amount of image quality changing effect is smaller than a preset first threshold, and sets the weight of the first evaluation value at 0 and sets the weight of the second evaluation value at 1 in a case where the amount of image quality changing effect is larger than a preset second threshold, which is larger than the first threshold.

5. The image capturing apparatus according to claim 1, wherein the exposure control unit sets a weight of the first evaluation value at 1 and sets a weight of the second evaluation value at 0 in a case where the reliability of the automatic correction processing is larger than a preset fourth threshold, and sets the weight of the first evaluation value at 0 and sets the weight of the second evaluation value at 1 in a case where the reliability of the automatic correction processing is smaller than a preset third threshold, which is smaller than the fourth threshold.

6. An exposure control method in an image capturing apparatus having an image sensor configured to convert a subject image into an image signal and output the image signal, an automatic correction unit configured to perform automatic correction processing including white balance correction processing on the image signal output from the image sensor, and an image quality changing unit configured to perform image quality change processing on the image signal on which the automatic correction processing has been performed by the automatic correction unit, comprising:
obtaining a first evaluation value indicating a largest value of an R signal, a G signal, and a B signal of the image signal on which the image quality change processing has been performed by the image quality changing unit;
detecting a second evaluation value indicating a luminance of the image signal on which the image quality change processing has been performed by the image quality changing unit;
calculating a control evaluation value using a weighted average of the first evaluation value and the second evaluation value according to at least one of an amount of image quality changing effect due to the image quality change processing performed by the image quality changing unit on the image signal and a reliability of the automatic correction processing performed by the automatic correction unit on the image signal; and
performing exposure control based on the control evaluation value calculated in the calculation step,
wherein a weight of the second evaluation value is relatively increased as the amount of image quality changing effect increases, and a weight of the second evaluation value is relatively increased as the reliability decreases.

7. An image capturing apparatus comprising:
an imaging unit configured to convert a subject image into an image signal and output the image signal;
an image quality changing unit configured to perform image quality change processing on an image signal;
a first evaluation value determination unit configured to determine a first evaluation value based on signals selected from R signals, G signals, and B signals of a first image signal;

a second evaluation value determination unit configured to determine a second evaluation value based on a luminance of the first image signal; and an exposure control unit configured to calculate a control evaluation value using a weighted average of the first evaluation value and the second evaluation value, wherein the exposure control unit relatively increases a weight of the second evaluation value in a case where an amount of image quality changing effect due to the image quality change processing performed by the image quality changing unit on the image signal is a first amount than in a case where the amount of image quality changing effect is a second amount that is smaller than the first amount.

8. The image capturing apparatus according to claim 7, wherein the image quality change processing includes processing that shifts at least one of white balance, black balance, and color balance of the image signal, and the amount of image quality changing effect includes at least one of a white balance shift amount, a black balance shift amount, and a color balance shift amount.

9. The image capturing apparatus according to claim 7, wherein the exposure control unit sets a weight of the first evaluation value at 1 and sets a weight of the second evaluation value at 0 in a case where the amount of image quality changing effect is smaller than a preset first threshold.

10. The image capturing apparatus according to claim 7, wherein the exposure control unit sets a weight of the first evaluation value at 0 and sets a weight of the second evaluation value at 1 in a case where the amount of image quality changing effect is larger than a preset second threshold.

11. An image capturing apparatus comprising:
an imaging unit configured to convert a subject image into an image signal and output the image signal;
an automatic correction unit configured to perform automatic correction processing including white balance correction processing on the image signal output from the imaging unit;
a first evaluation value determination unit configured to determine a first evaluation value based on signals selected from R signals, G signals, and B signals of a first image signal;
a second evaluation value determination unit configured to determine a second evaluation value based on a luminance of the first image signal; and
an exposure control unit configured to calculate a control evaluation value using a weighted average of the first evaluation value and the second evaluation value,
wherein the exposure control unit relatively increases a weight of the second evaluation value in a case where a reliability of the automatic correction processing performed by the automatic correction unit is a first value than in a case where the reliability is a second value that is larger than the first value.

12. The image capturing apparatus according to claim 11, wherein the reliability of the automatic correction processing is a reliability of the white balance correction processing.

13. The image capturing apparatus according to claim 11, wherein the exposure control unit sets a weight of the first evaluation value at 0 and sets a weight of the second evaluation value at 1 in a case where the reliability of the automatic correction processing is smaller than a preset third threshold.

14. The image capturing apparatus according to claim 11, wherein the exposure control unit sets a weight of the first evaluation value at 1 and sets a weight of the second evaluation value at 0 in a case where the reliability of the automatic correction processing is larger than a preset fourth threshold.

15. An exposure control method in an image capturing apparatus having an imaging unit configured to convert a subject image into an image signal and output the image signal, and an image quality changing unit configured to perform image quality change processing on an image signal, comprising:
determining a first evaluation value based on signals selected from R signals, G signals, and B signals of a first image signal;
determining a second evaluation value based on a luminance of the first image signal; and
calculating a control evaluation value using a weighted average of the first evaluation value and the second evaluation value,
wherein a weight of the second evaluation value is relatively increased in a case where an amount of image quality changing effect due to the image quality change processing performed by the image quality changing unit on the image signal is a first amount than in a case where the amount of image quality changing effect is a second amount that is smaller than the first amount.

16. An exposure control method in an image capturing apparatus having an imaging unit configured to convert a subject image into an image signal and output the image signal, and an automatic correction unit configured to perform automatic correction processing including white balance correction processing on the image signal output from the imaging unit, comprising:
determining a first evaluation value based on signals selected from R signals, G signals, and B signals of a first image signal;
determining a second evaluation value based on a luminance of the first image signal; and
calculating a control evaluation value using a weighted average of the first evaluation value and the second evaluation value,
wherein a weight of the second evaluation value is relatively increased in a case where a reliability of the automatic correction processing performed by the automatic correction unit is a first value than in a case where the reliability is a second value that is larger than the first value.

* * * * *